Nov. 15, 1966 R. S. SINN 3,286,235

INFORMATION STORAGE SYSTEM

Filed May 5, 1961 7 Sheets-Sheet 1

INVENTOR.
ROBERT S. SINN
BY Morton C. Jacobs
ATTORNEY

INVENTOR.
ROBERT S. SINN
BY Morton C. Jacobs
ATTORNEY

INVENTOR.
ROBERT S. SINN
BY Milton [signature] Jacobs
ATTORNEY

INFORMATION STORAGE SYSTEM

Filed May 5, 1961 7 Sheets-Sheet 4

INVENTOR.
ROBERT S. SINN
BY [signature]
ATTORNEY

INVENTOR.
ROBERT S. SINN
BY Milton C. Jacobs
ATTORNEY

INVENTOR.
ROBERT S. SINN
BY
ATTORNEY

Nov. 15, 1966 R. S. SINN 3,286,235

INFORMATION STORAGE SYSTEM

Filed May 5, 1961 7 Sheets-Sheet 7

INVENTOR.
ROBERT S. SINN
BY [signature]
ATTORNEY

United States Patent Office 3,286,235

Patented Nov. 15, 1966

3,286,235
INFORMATION STORAGE SYSTEM

Robert S. Sinn, Seaside Park, N.J., assignor to Ultronic Systems Corp., Pennsauken, N.J., a corporation of Delaware Filed May 5, 1961, Ser. No. 108,120
7 Claims. (Cl. 340—172.5)

This invention relates to data storage systems and particularly to a system for storing information about stock transactions.

A data storage system is provided for storing stock transaction information in a form in which the information can be readily selected by an operator in a stock broker's office or the like. Immediately upon selection, the information is made available to the operator. A system is provided for maintaining the stored information in updated form.

Accordingly, it is an object of this invention to provide a new and improved data storage system for maintaining current files of stock transaction information.

Another object is to provide a new and improved data storage system for furnishing stock transaction data to requesting parties and for maintaining the stored data in updated condition.

Another object is to provide a new and improved magnetic drum storage and write-in system.

Another object is to provide a new and improved digital transmission and checking system.

In accordance with an embodiment of this invention, stock transaction information to be written in one or more cyclic memories, such as a magnetic drum, is transmitted from a central source in the form of messages. The latter contain the stock identification and one or more different groups of data on the stock transactions. Means are provided for synchronizing the handling of the messages with the operation of the memory and for assembling the message information for storage in the proper memory location. The accuracy of transmitting the message is checked by a parity check system of a special kind.

The foregoing and other objects of this invention, the features thereof, as well as the invention itself, may be more fully appreciated and understood from the following description when read together with the accompanying drawing in which.

Figures 1, 9:
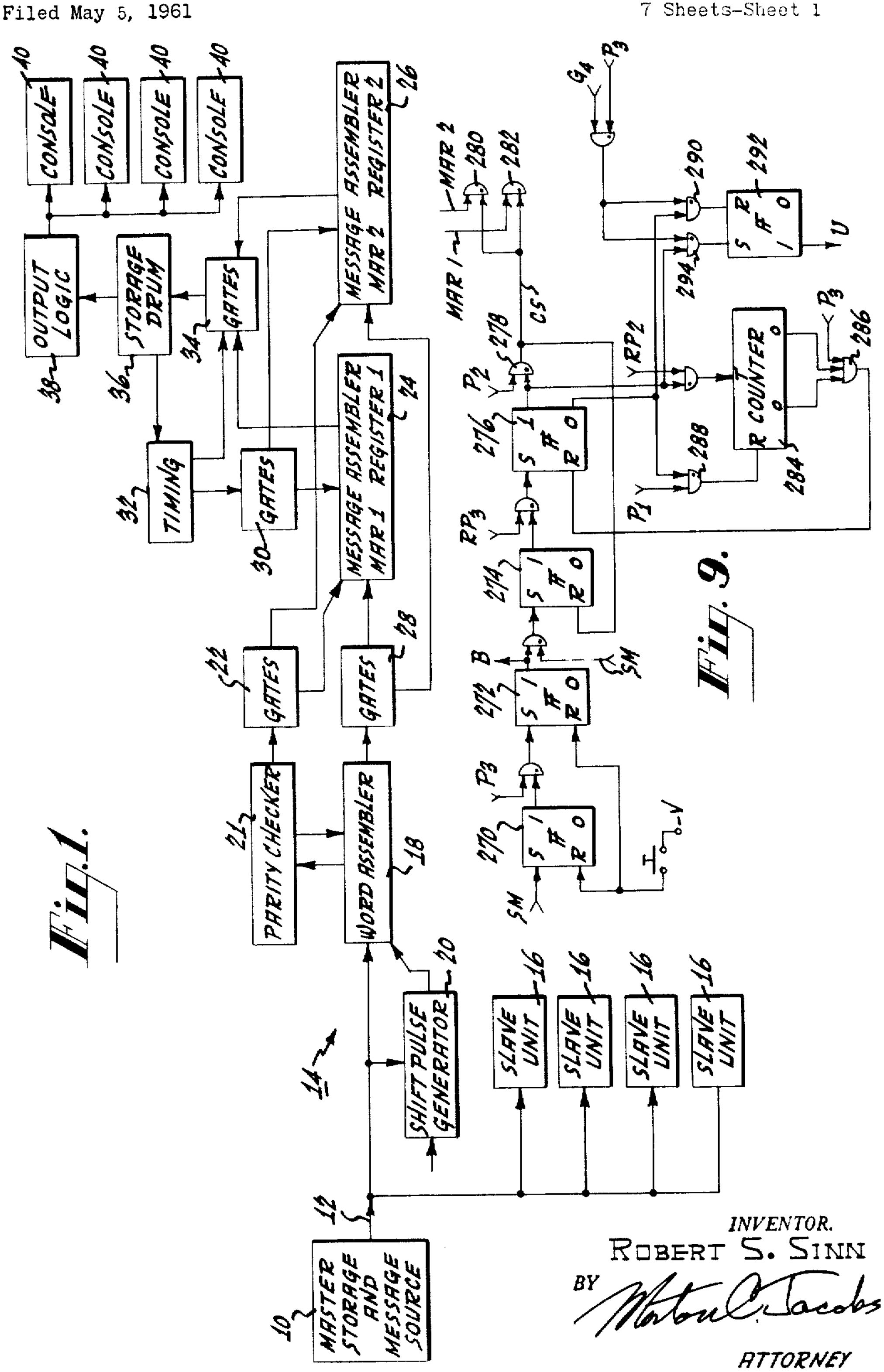
FIG. 1 is a schematic block diagram of an information storage system embodying this invention.
Figure 10:
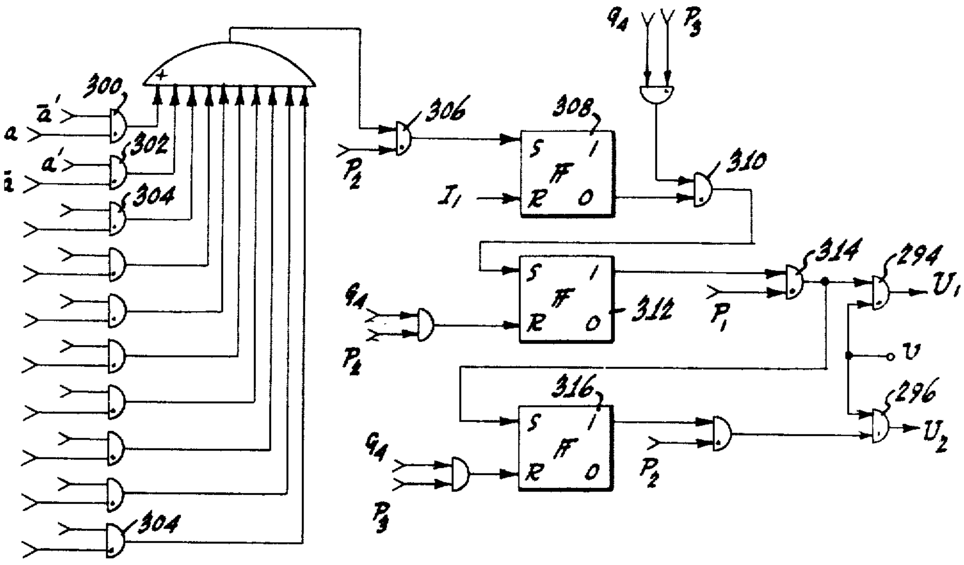
Figure 8A:
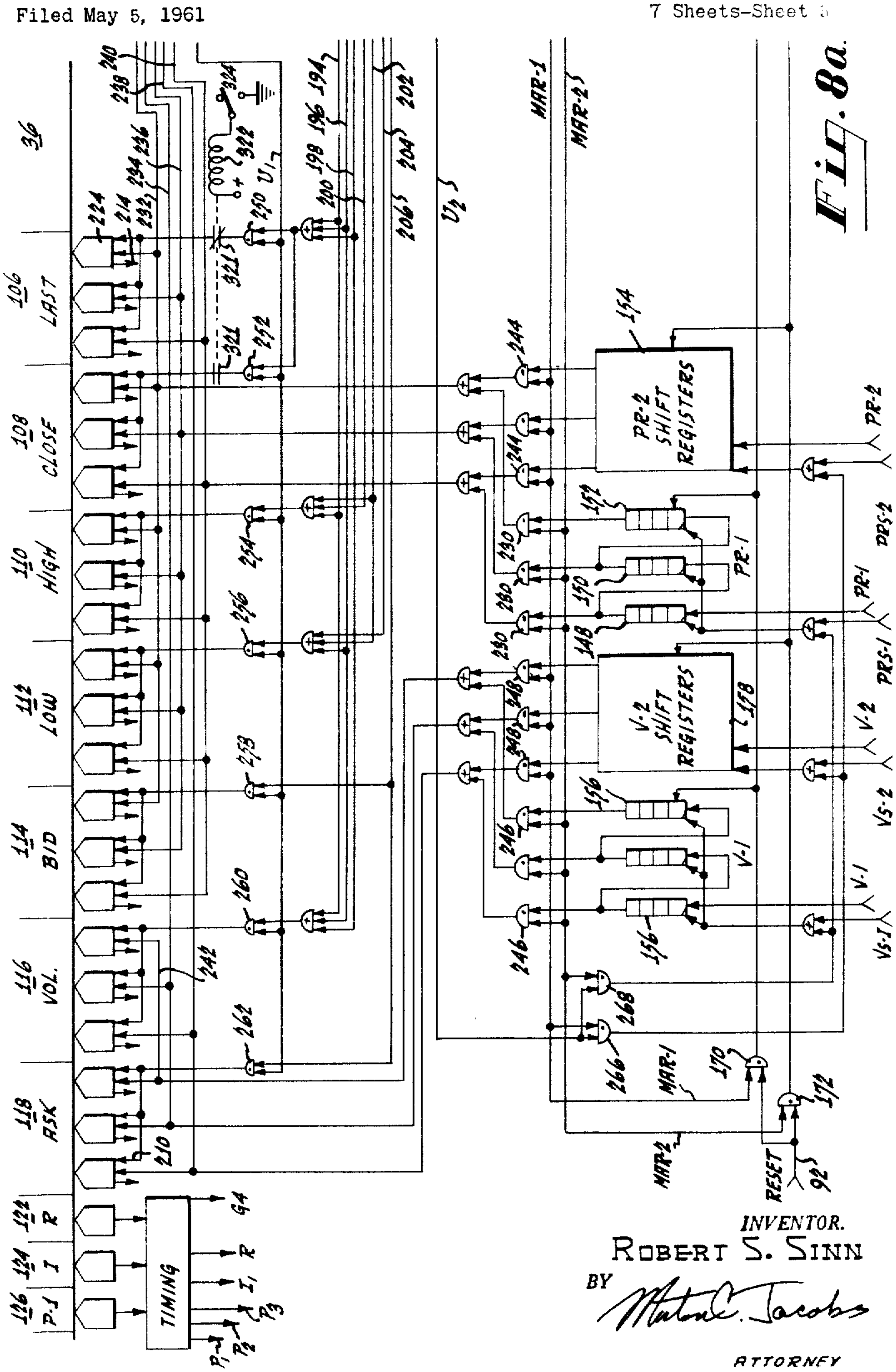
Figure 8B:
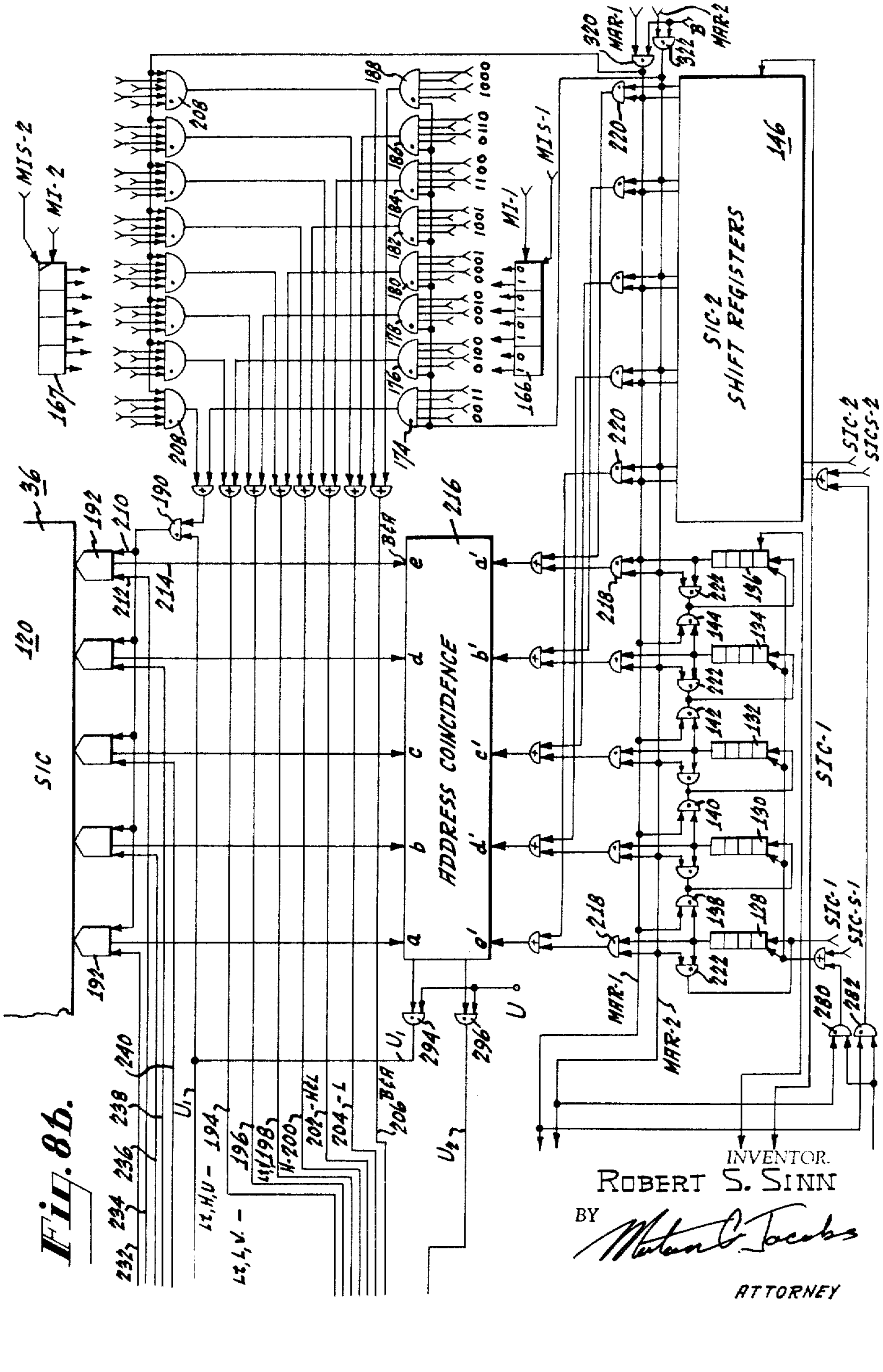
Figure 12:
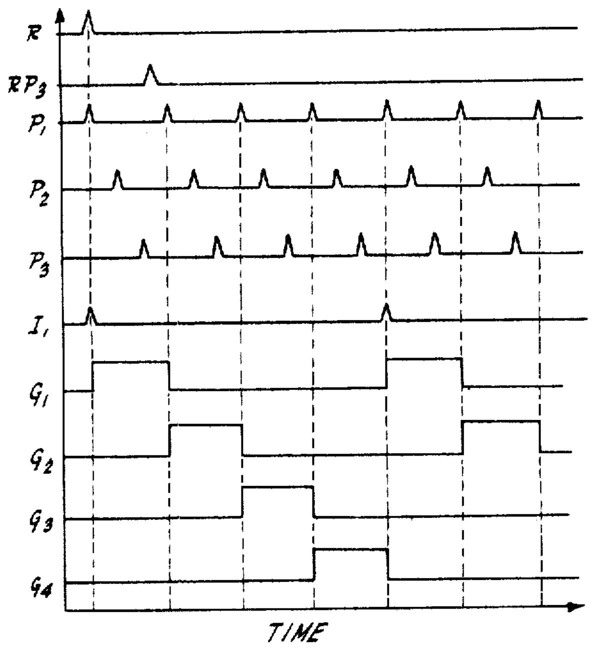
Figure 11:
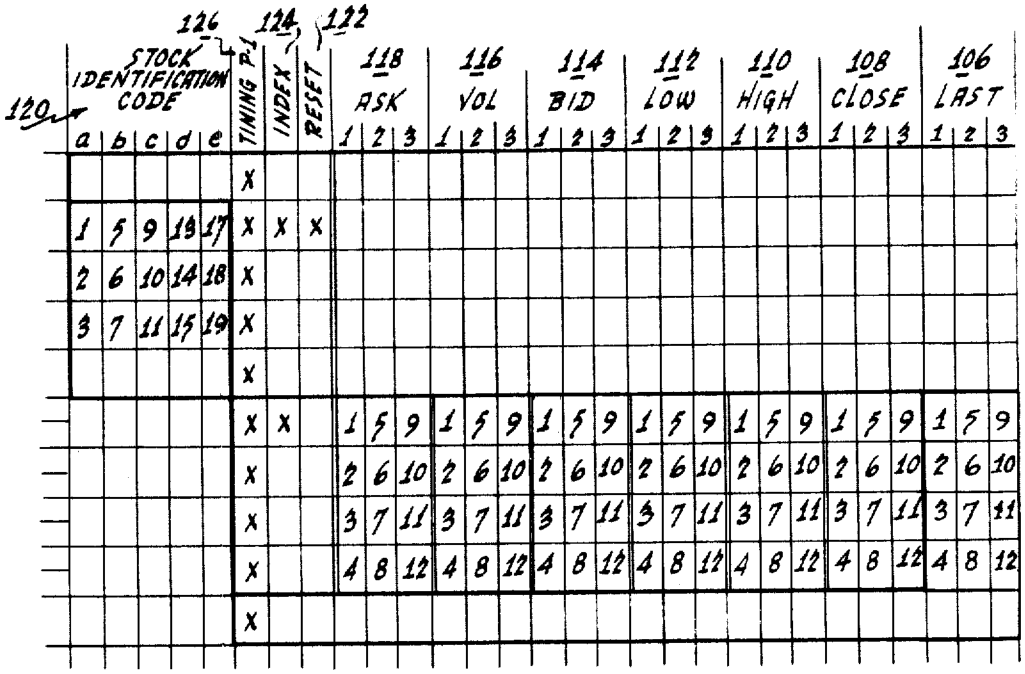

FIGS. 8*a* and 8*b* are schematic block and circuit diagrams of the storage and message assembler portions of the system of FIG. 1;

FIG. 9 is a schematic block and logic diagram of a control for the system portion of FIGS. 8*a* and 8*b*;

FIG. 10 is a schematic logic and block diagram of an address coincidence that may be used in the system portion of FIG. 8*b*;

FIG. 11 is a schematic diagram of the arrangement of information on the storage drum of FIGS. 8*a* and *b*; and FIG. 12 is an idealized graphical diagram of the time relation of the waveforms occurring in this system.

In the drawing, corresponding parts are referenced throughout by the same numerals.

In FIG. 1 a source of messages containing data on various transactions such as those of the stock or commodity markets is assumed to be supplying such messages asynchronously. The source 10 may be a manually operated source, or it may be a master storage system with automatic arrangements for supplying the information on a transmission line 12.

The messages supplied on the line 12 go to a slave unit 14 shown in some detail as well as to a plurality of other slave units 16, each of which may be substantially the same as the unit 14. In the following discussion, the unit 14 is described in detail, and this description may be considered to be applicable to the other units 16, each of which may be operated independently of the others.

In the unit 14 the messages supplied on the transmission line 12 go to a word assembler 18 which includes a shift register that is controlled by pulses from a shift pulse generator 20 that also receives the signals on the transmission line 12. The words in the assembler 18 are checked by a parity check 21 which controls the information handling in the assembler 18 as well as (via logic control gates 22) in message assemblers 24 and 26. The words assembled in the assembler 18 are supplied to the message assemblers 24 and 26 via control gates 28. Timing and address signals on storage drum 36 are developed in timing control 32 and control gates 30 to control the assemblers 24 and 26. The timing signals from the generator 32 are also used to control the passage through gates 34 of the messages in the assemblers 24 and 26 for writing on the storage drum 36. The reading from the drum 36 is via the output logic 38 to a plurality of consoles 40. The output system including the output logic 38 and consoles 40 are described in my copending patent application, Serial No. 102,882, filed April 13, 1961, and form part of the overall system in which this invention is used.

In operation, binary signals are supplied serially in a suitable form (such as mark and space or pulse and no pulse) via the transmission line 12 to the word assembler 18. In the assembler 18 successive words of the message, each word being ten bits long, are checked for parity and also examined for control operations. The shift pulse generator 20 synchronizes the timing of the signals coming in on the transmission line 12 with the operation of the remainder of the circuitry, all of which is synchronous with the storage drum 36. The successive words passed by the assembler 18 are established in one of the message assemblers MAR–1 or –2, and successive messages are established in these registers alternately. The information of these messages is passed via the gates 34 for writing on the storage drum 36 under the control of the logic in gates 30.

Figure 2:
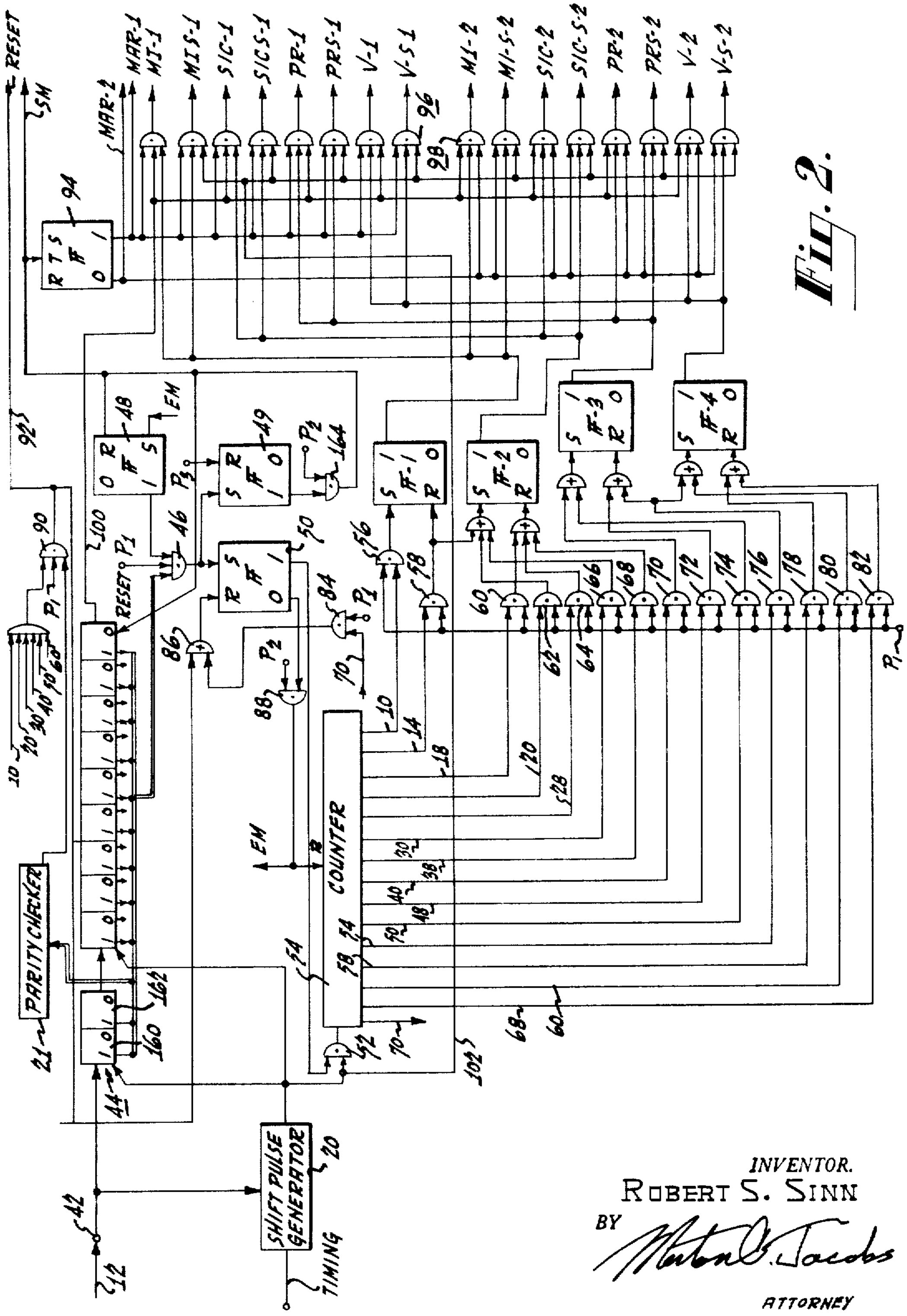
FIG. 2 is a schematic block and logic diagram of a portion of the system of FIG. 1.

In FIG. 2 the signals are supplied serially to the input terminal 42 from the data transmission line 12. These signals are in the form of voltage levels with a low voltage, for example, representing the binary digit "1" and a high voltage level, representing a binary "0." These signals are applied to the shift pulse generator and also to the first stage of a 10-stage shift register 44. This shift register 44 is made up of a cascaded series of flip-flops, and shift pulses therefor are derived from the generator 20. An appropriate form of shift register is described in the aforementioned copending patent application.

The output from the ten stages of the shift register 44 are taken in parallel from both the 1-outputs and the 0-outputs (as indicated by the double-line connection) and supplied to the parity checker 21. The ten 1-outputs are also supplied to an input of a synchronizer gate 46. The other inputs to the gate 46 are a timing line carrying pulse P–1, and the 1-output of a flip-flop 48. The flip-flops described hereinafter are each of the conventional bistable multivibrator type, having a set (S) input and a reset (R) input, and a 1-output and a 0-output corresponding respectively to the set and reset inputs. When the flip-flop is set, the 1-output is a gate-enabling signal and the 0-output is a gate-disabling signal; when the flip-flop is reset, the outputs are the reverse.

The output of the gate 46 sets a start-of-message flip-flop 49 which is reset by P–3 timing pulses. The output of the gate 46 also sets a counter flip-flop 50, the 1-output of which is supplied to a gate 52 that also receives the shift pulses from generator 20. The output of the gate 52 is supplied to a counter 54. The counter 54 is a 7-stage binary counter together with a decoder (not shown) arranged to supply gate-enabling signals on a plurality of lines corresponding to certain counts as indicated in FIG. 2. The lines for counts of 10, 14, 18, 20, 28, 30, 38, 40, 48, 50, 54, 58, 60, and 68 are respectively connected to a series of gates 56–82, and the count 70 is applied to a gate 84. The other inputs to these gates 56–84 are P–1 timing pulses.

The output of the 10-count gate 56 sets a first control flip-flop, FF–1, and the output of 14-count gate 58 resets FF–1. The output of gate 58 is also supplied via a buffer to set FF–2. In a similar fashion, the outputs of gates 60–82 are used to set or reset various ones of the flip-flops, FF–2, FF–3, and FF–4, as is described hereinafter in detail. The output of gate 84 is supplied via a buffer 86 to reset counter flip-flop 50, and the latter's 0-output is gated with timing pulse P–2 in gate 88 to reset counter 54.

The output of the parity checker is supplied to a gate 90 together with a timing pulse P–1. Also supplied to the gate 90 via a buffer are the 10, 20, 30, 40, 50, and 60 counter output lines. The output of the gate 90 on signal line 92 is used as a reset signal and is supplied via buffer 86 to reset the counter flip-flop 50.

The output of start-of-message flip-flop 49 is connected via gate 164 to an SM line at the trigger input of a flip-flop counter 94, which is used to register the operation on odd or even messages. The 1-output of a message counter 94 is used to indicate a processing of odd messages, and the 0-output is used for processing even messages. The odd and even output lines of the message counter 94 are represented by the symbols MAR–1 and MAR–2, corresponding to the message assemblers (FIG. 1). The 1-output of the counter 94 is used to control a first series of assembler gates 96, and the 0-output is used to control a second series of assembler gates 98. These assembler gates 96 and 98 are enabled by certain ones of the flip-flops, FF–1 to FF–4. A third input to certain ones of the gates 96 and 98 is the serial output of the word assembler 44 via signal line 100, and a third input to the others is the output of the shift pulse generator via line 102. That is, certain of the gates 96 and 98 pass information signals coming via line 100, and the others of these gates 96 and 98 pass shift pulse signals via line 102.

Figure 4:
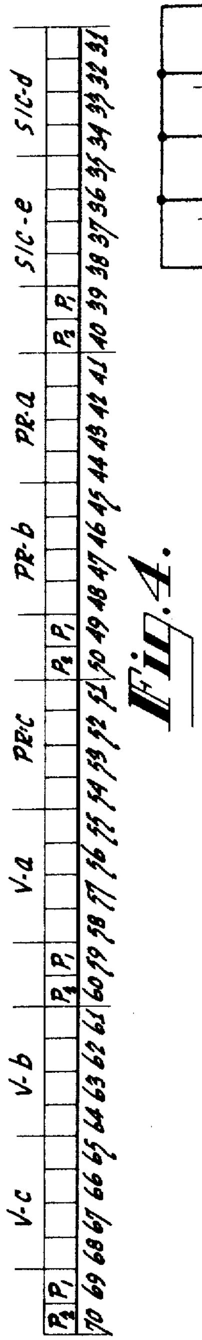
FIG. 4 is a schematic diagram illustrating the second part of the message of FIG. 3.
Figure 3:
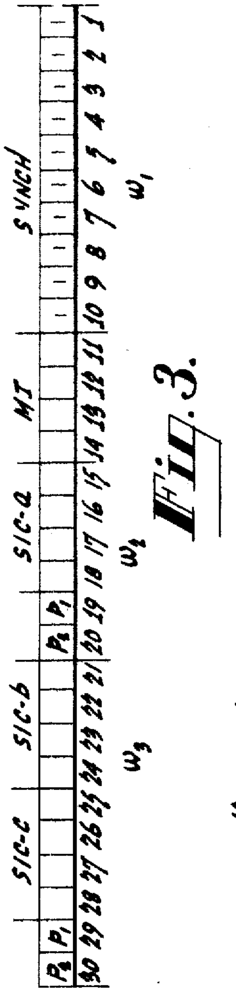
FIG. 3 is a schematic diagram illustrating the format of the first part of a message to be assembled and stored in the system of FIG. 1.
Figure 5:
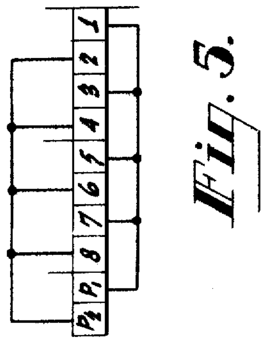
FIG. 5 is a schematic diagram illustrating the parity check relationships in the message formats of FIGS. 3 and 4.

In FIGS. 3 and 4, a diagram of the format of a message which is transmitted from the source 10 is illustrated. This message is composed of 70 bits in series. The first ten bits of the train are a series of binary "1's" which are used as the synchronizing signals of a message. The remaining bits of the message are divided into groups of ten, each group of ten bits including eight information bits followed by two parity check bits, *p*–1 and *p*–2. The association of the parity check bits and the eight bits preceding them is indicated in FIG. 5. That is, the odd-position bits in positions 1, 3, 5, and 7 are associated with the first check bit *p*–1 in position 9; odd parity is used for that combination of five bits; that is, the number of binary 1's in positions 1, 3, 5, 7, and 9 is odd. Check bit *p*–2 is associated with the even positions 2, 4, 6, and 8, and together they provide even parity. In addition, the check bits *p*–1 and *p*–2 together with the preceding eight bits provide an overall odd parity. With this interleaved arrangement, the group of four signals being checked in the same parity group are spaced in the serial train of digital signals being transmitted along the transmission line 12. Consequently, spurious signals or transients occurring on the line which would tend to introduce errors in the transmission are less likely to occur in two signals in the same check group. The errors of adjacent signals tend to produce a cancelling effect that might not be detected if checked for parity within the same group. However, by checking adjacent signals in different parity groups by this parity check arrangement, errors are more likely to be detected.

Figure 7:
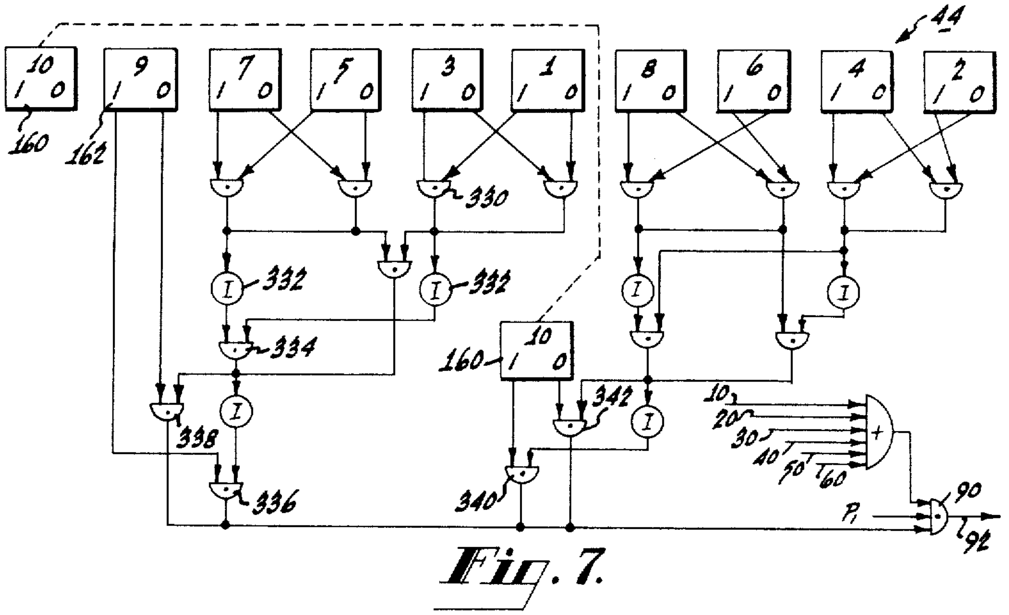
FIG. 7 is a schematic block and logic diagram of a parity checker that may be used in the system of FIG. 2.

The logic of the parity checker 21 is shown in detail in FIG. 7. The parity of the odd position stages (stages 1, 3, 5, 7, and 9) is checked in one set of logic, and the parity of the even stages is checked in another set. The correct parity of the odd stages is an odd parity (i.e. an odd number of 1's), and the parity of the even stages should be an even parity (i.e. an even number of 1's). The principle involved in checking the odd stages is to gate together an even number of 1's (i.e. two 1's or zero 1's). An output signal from any one of these gates in the form of a gate-enabling signal represents an even number of 1's as the input. Inverters 332 are used to convert an even-representative signal to an odd-representative signal in order that they may be combined in a gate 334 or 336. The output of the gates 336 or 338 is an enabling signal for even parity; that is, a gate-enabling signal indicates that incorrect parity exists in the odd stages of the word assembly register 44. The logic of the even stages of that register 44 is checked for parity in a similar fashion except that the signals are combined so that the output of any one gate is a gate-enabling signal only when the gate receives an odd number of input 1's. The output of the last stage of the pyramid logic at gates 340 and 342 is a gate-enabling signal only when incorrect (odd) parity exists in the even stages. The output of the parity checker is applied to the gate 90 together with a timing pulse signal P–1 as well as a gate-enabling signal from the counter outputs corresponding to counts 10, 20, 30, 40, 50, or 60, which counter outputs are buffed together to be applied to the gate 90. Thereby, the output of the gate 90 is a pulse at P–1 time when incorrect parity exists in the formation established in the word assembler register 44 at the appropriate times (i.e. the times when the parity bits are in the ninth and tenth stages 162 and 160, respectively).

In the message format, the four bits in positions 11–14 are used as a message identifier to describe the type of message being transmitted and the information being sent. The next four bits in positions 15–18 are the first four bits making up a 20-bit stock identification code. These groups of stock identification code bits, SIC–*a* to SIC–*e* (positions 15–38) are described in detail in the aforementioned copending application; they make up a 20-bit drum address as shown in FIG. 11. Check bits *p*–1 and *p*–2 are inserted at the appropriate positions 19, 20 and 29, 30 and 39, 40 as noted above and as shown in FIGS. 3 and 4.

The information in bit positions 41–54 are identified as three 4-bit groups PR–*a* to PR–*c*, and they represent price data being transmitted. The information in bit positions 55–68 is broken up in three 4-bit groups identified as V–*a* to V–*c*, and these groups of bits represent volume information, that is, volume of shares of stocks traded or other information about the stock transaction including certain price information as is indicated hereinafter.

The storage of information on the drum 36, which may be a conventional magnetic storage drum, is shown in FIGS. 8*a* and 8*b*. FIGS. 8*a* and 8*b* are to be reviewed together, with 8*a* on the left and 8*b* on the right and with the lines extending from left to right being interconnected as indicated. The drum is divided up into information bins 106–118 corresponding to the different types of information being stored thereon. These bins include bins 106 and 108 which are used interchangeably for storage of "Last" or "Closed" price information, bin 110 for the High stock market price, bin 112 for Low price, bin 114 for Bid price, bin 116 for Volume, bin 118 for Ask price. An additional bin (not shown) may be used for storage of the number of transactions on a particular stock, and other bins may be used for other classes of information. A bin 120 is used for storing the address information in the form of the stock identification code (SIC) signals.

Timing tracks 122, 124, and 126 on the drum 36 contain stored signals that are used to generate timing signals; four equally spaced reset signals in track 122 generate a reset pulse once for each quadrant of the drum. A plurality of index signals in track 124 occur once for each cell of four bit positions around the periphery of the drum; and a P–1 signal in track 126 occurs for each bit position. The relationship of these timing pulses and also of the information arranged on the drum in the various bins is indicated schematically in FIG. 11 which shows a drum format that is used with this invention. A timing pulse diagram for the timing signals is shown in FIG. 12.

In FIG. 11, the information cells (each of 4-bit positions) in the bins 106–118 are offset rotationally from the stock identification code or drum address associated therewith, as indicated in FIG. 11. That is, each address has twenty SIC bits that are stored in a cell of five tracks *a–e*. The corresponding price information for that address is stored in the next cell position in bins of three tracks each. With this arrangement, after a selected address is located on the drum, the corresponding cells in the information bins are immediately available for writing in or reading out.

FIG. 12 shows the time relation of the three timing pulses P–1 to P–3 that are generated for each bit position, and of the pulses G–1 to G–4 that successively mark the four bit positions within a cell, together with the I pulse generated at the beginning of each cell, and R pulse generated at the beginning of each quadrant. A suitable generator for these timing pulses is described in the copending patent application. The rate of timing pulses P–1 is very much higher than the rate of shift pulses from generator 20.

The message assembly registers MAR–1 and –2 are shown in FIGS. 8*a* and 8*b* and include a plurality of shift registers corresponding to the three classes of information transmitted in the message, namely, SIC, PR, and V.

The SIC–1 shift registers (part of MAR–1) include five 4-bit shift registers 128, 130, 132, 134, and 136. The first stage of the shift register 128 receives signals from the line SIC–1, and the last stage of that register 128 supplies signals via gate 138 to the first stage of shift register 130; the last stage of which supplies signals via gate 140 to the first stage of shift register 132, and so on. By means of the gates 138, 140, 142, and 144 the five registers 128–136 are connected as a single shift register for purposes of loading. The shift signals for the SIC–1 registers is via the line SICS–1. A second set of SIC shift registers 146 (part of MAR–2) is constructed in a similar fashion and receives signals via the line SIC–2. The shift signals SICS–2 for the SIC–2 shift registers is via the line SICS–2.

Three PR–1 shift registers 148, 150, and 152 (part of MAR–1) are connected in cascade with the last stage of the first register 148 feeding the first stage of the second register 150, and the last stage of the latter feeding the first stage of the third register 152. The information signals on the line PR–1 are supplied to the first stage of the first register 148, and the shift signals on the line PRS–1 are used to shift all of the registers. PR–2 shift registers are constructed and operated in a similar fashion and are part of the MAR–2 registers.

V–1 shift registers 156 are arranged as a group of three similar to the PR–1 registers and are part of the MAR–1 registers. The first V–1 register 156 receives the information signals via the line V–1, and the shift signals are supplied via the line VS–1. V–2 shift registers 158 are constructed and operated in a similar fashion, and are associated with the MAR–2 registers. The PR and V shift registers do not include gates between registers (for example, between the registers 148 and 150).

An MI–1 shift register 166 has four stages for storing the four bits supplied on line MI–1, with shift pulses supplied on line MIS–1. An MI–2 register 167 has a similar construction and is supplied by line MI–2.

The system described thus far operates in the following fashion. The signals coming into the input terminal 42 (FIG. 2) in a serial train are established in the first stage 160 of the word assembler register 44. Shifting of the signals to the second stage 162 and successive stages of that register 44 is under the control of shift pulses from the generator 20, which shift pulses are generated in a proper time relationship to the information signals. The first ten bits of a message are all binary 1's, a combination which is unique under the circumstances of synchronizer flip-flop 48 being set. This condition of all 1's with the flip-flop 48 set is gated by the succeeding P–1 timing pulse through the gate 46 to set the flip-flops 49 and 50. The setting of the counter flip-flop 50 enables the gate 52 to pass succeeding shift pulses to be counted by the counter 54.

The setting of flip-flop 49 resets the synchronizer flip-flop 48 via gate 164 to close gate 46 and prevent further start-of-message recognition until flip-flop 48 is again set. The P–2 timing pulse that passes gate 164 also triggers message counter 94, let us say to the odd-count state.

The passage of the second ten bits of the message into the word assembler 44 clears the synchronizing bits 1–0 from that assembler 44 and serves to establish a corresponding count of 10 in the counter 54. This count enables the gate 56 so that the succeeding P–1 pulse supplied to that gate 56 sets FF–1. The set condition of FF–1 enables the gate MI–1 which is also enabled by the 1-output of the message counter 94.

Shift pulses corresponding to the count 11 and 14 in the counter 54 shift out the MI bits successively from assembler 44 to line 100, there to be passed by gate MI–1 to the associated line. These four MI signals are fed to the MI shift register 166, which has four stages to receive the four bits. The MIS–1 gate is also enabled by FF–1, and this gate passes the shift pulses generated synchronously on line 102 by the generator 20. These shift pulses are supplied to the MI–1 shift register 166 in proper time relationship to the information signals so that the register 166 is properly loaded.

At the count of 14, FF–1 is reset via gate 58, and FF–2 is set at the same time. At that time, message bits 15–24 are in the assembler 44, and, appropriately, gates SIC–1 and SICS–1 are enabled by FF–2 to pass these SIC signals. Thus, shift pulses corresponding to a count of 15–18 shift out the first 4-bit group SIC–*a* from the assembler 44 and through the SIC–1 gate to load the first SIC–1 shift register 128. The corresponding shift signals are passed by the SICS–1 in a manner similar to that described above. At the count of 18, FF–2 is reset via the gate 60 and remains reset until the count of 20 at which time it is set via the gate 62. Thus, the parity signals in bit positions 19 and 20 are not passed by any of the gates connected to line 100, and these signals are dropped as the assembler 44 is shifted.

At the count of 20 in the counter 54, the FF–2 is set via the gate 62. Accordingly, gates SIC–1 and SICS–1 are enabled and pass the signal groups SIC–*b* and SIC–*c* as they are shifted out of the assembler 44. At count 28, FF–2 is reset again to close the read-out gates 96 and 98 until the parity bits in positions 29 and 30 are shifted out of the assembler register 44. At that count of 30, FF–2 is again set via gate 66, and gate SIC–1 is again enabled to pass signal groups SIC–*d* and SIC–*e* in message bit positions 31–38.

Again at the count of 38, FF–2 is reset via gate 68, and the gates 96 and 98 remain closed until parity signals in bit positions 39 and 40 are shifted out of the assembler 44. At the count of 40, a pulse is passed through gate 70 to set FF–3, which condition results in gates PR–1 and PRS–1 being enabled to pass pulses to the PR–1 shift registers (FIG. 8*a*). Until the count of 48, signal groups PR–*a* and PR–*b* are shifted out of the assembler 44 and into the PR–1 shift registers (FIG. 8*a*). During the counts of 49 and 50 the gates 96 and 98 are again all closed. During the counts of 51–54, FF–3 is again set to enable the PR–1 gate. At the count of 54, FF–3 is reset, and FF–4 is set to enable the gates V–1 and VS–1. During the counts of 55–58 and 61–68, FF–4 is set and gate V–1 passes the V–*a*, V–*b*, and V–*c* signals to the V–1 shift registers 156 (FIG. 8*a*).

Upon the count of 70 in the counter 54, the next P–1 timing pulse passes gate 84 to reset the synchronizer flip-flop 50; which condition is strobed by timing pulse P–2 in gate 88 to reset the counter 54. This reset pulse is also used as an ending signal pulse that is applied to the flip-flop 48 to enable the gate 46 to recognize the next set of ten synchronizer pulses that are then set up in the word assembler 44. Upon the next set of ten synchronizer pulses being established in the word assembler 44 (which condition can immediately follow the preceding word), the gate 46 passes a pulse to again set flip-flops 49 and 50 and repeat the cycle just described.

Upon flip-flop 49 being set a second time, the next P–2 pulse passes gate 164 to reset flip-flop 48 and again trigger the counter flip-flop 94 back to the even-count state. Under those conditions the 1-output of flip-flop 94 is a disabling signal, and gates 96 remain closed. However, the 0-output of flip-flop 94 is an enabling signal, and gates 98 are then in a position to pass signals coming from the word assembler 44 via line 100 to the SIC–2, PR–2, and V–2 shift registers 146, 154, and 158 in a manner similar to that described above. The operation is generally similar to that described above for the first message received. This operation is repeated for succeeding messages with the flip-flop 94 being in the 1-state for odd messages to control the passage via gates 96 of information signals to the MAR–1 registers, and being in the 0-state for even messages, under which circumstances gates 98 pass information signals to the MAR–2 registers.

This operation continues except if the parity checker 21 detects an error in the 10-bit group of a message being processed. The output of the parity checker 21 is strobed at counts in the counter 54 of 10, 20, 30, 40, 50, and 60, which counts correspond to the successive 10-bit signal groups being established in the word assembler. That is, at count 10, message bits 11–20 are established in the register assembler 44, with parity bits *p*–1 and *p*–2 being established in the register positions 162 and 160. If the parity is correct, the output of the parity checker 21 is a signal to maintain gate 90 in a disabled condition so that there is no pulse supplied to line 92.

However, if incorrect parity is detected, the output of the parity checker is an enabling signal applied to the gate 90; at the count of 10, a second enabling signal is applied to the gate 90, and the next timing pulse P–1 is passed by that gate to supply a reset signal to the line 92. This reset signal is passed by the buffer 86 to reset the counter flip-flop 50. Thereby, the counter 54 is likewise reset, which results in FF–1, –2, –4 also being reset, and all of the gates 96 and 98 being closed.

The message signals may continue to be supplied to the input terminal 42, and the shift pulse generator continues to generate shift pulses which are supplied to the word assembler register 44. The outputs of that register 44 appearing on the line 100 are not passed by any gate, and, consequently, this information is eliminated as containing an error.

The reset pulse on line 92 is also used to clear the shift registers in MAR–1 or MAR–2 which have partly been filled by the information being supplied. That is, the reset line 92 is connected to two gates 170 and 172 (FIG. 8*a*) which are respectively enabled by signals on the lines MAR–1 and MAR–2 (the outputs of flip-flop 94). Thus, when the MAR–1 registers are being loaded via the gates 96, the gate 170 is enabled to pass a reset pulse generated on line 92. If that reset pulse occurs, the flip-flop stages of the registers in V–1, PR–1, and SIC–1 are all reset so that the portion of the information already supplied to those registers is erased. In a similar fashion the registers of MAR–2 are reset if a parity error is detected in an even message. After such reset operation, the equipment is in condition to process the next message received in due course.

The message identifier register MI–1 has established in it a 4-bit code representative of the type of information being carried by the message. This message identifier code is used to control the switching of the message information into the proper one of the bins 106–120.

Of the sixteen possible MI combinations, eight are utilized in the system shown in FIG. 8*b*. The 1-output and the 0-output from each of the four stages of MI register 166 are combinatorily connected to eight decoder gates 174–188. The gate 174 produces an ouput in response to the code combination 0011 in the four stages of register 166; which code is used to identify a message carrying a change of the address or SIC code. The output of gate 174 is supplied via a buffer to a gate 190 which controls the application of "write" signals to read-write recording heads 192 for the five tracks of the SIC or drum address bin 120. The gate 176 produces an output in response to the MI combination 0100 and represents a message containing Last transaction price, the High price, and the Volume of the transaction. The output of gate 176 is connected via line 194 to enable the supply of "write" signals to the corresponding bins. Gate 178 responds to the code combination 0010 to enable via line 196 the supply of "write" signals for writing in the Last, Low, and Volume bins. Gate 180 responds to the code combination 0001 to enable via line 198 the supply of "write" signals to control the writing into the Last and Volume bins. Gate 182 responds to the code combination 1001 to enable via line 200 the supply of "write" signals to control the writing in the High bin. Gate 184 responds to the code combination 1100 to enable via line 202 the supply of "write" signals for the High and Low bins; gate 186 responds to the code combination 0110 to enable via line 204 the supply of "write" signals for the Low bin; and gate 188 responds to the code combination 1000 to enable via line 206 the supply of "write" signals for the purpose of writing in the bins for Bid and Ask.

The register MI–2 in a similar fashion has its outputs decoded in the gates 208 which respond to corresponding code combinations and operate in a manner similar to gates 174–188 to supply signals to corresponding ones of the lines for enabling the appropriate "write" operation.

Each of the recording heads 192 for the SIC bin 120 has three lines; one of the lines 210 is a write-signal line which controls the writing operation in the head 192, a second line 212 is an information line which carries signals to be written on the associated track via the recording head 192 and under the control of the "write" signals, and the third line 214 is a read-signal line which in the absence of write signals on the line 210, supplies signals being read from the associated track. The five read lines 214 from the heads 192 of the SIC bin 120 are connected to *a, b, c, d,* and *e* inputs of an address coincidence 216. The output of the fourth stage of each of the shift registers 128, 130, 132, 134, and 136 of the SIC–1 shift registers is connected via a gate 218 and a buffer to corresponding *e', d', c', b',* and *a'* inputs, respectively, of the address coincidence 216. The gates 218 also receive enabling signals from the MAR–2 line. Similar outputs from the SIC–2 shift registers 146 are connected via gates 220 and the aforementioned buffers to the *a', b', c', d', e'* inputs of the address coincidence 216. The gates 220 are enabled by signals on the line MAR–1.

Each of the SIC–1 shift registers 128–136 is provided with a gate 222 which is used for permitting recirculation within the shift register. Each of the shift registers 128–136 functions as a 4-stage recirculating register when their gates 222 are enabled, and the loading gates 138–144 are disabled.

Each of the information bins 106–118 is provided with three information tracks (as represented in FIG. 11) and includes a recording head 224 for each track, which head is of the same type as the head 192 described above. The read-out lines 214 from these heads 224 are connected into the output logic 38 (FIG. 1), a suitable form of which adapted for use with this system is described in the aforementioned copending patent application.

The outputs of the fourth stage of each of the PR–1 shift registers 148, 150, and 152 are supplied to gates 230, which receive enabling signals from the line MAR–2. The outputs of the gates 230 are connected via buffers to certain ones of a group of information busses 232–240; in particular, the outputs of the gates 230 are connected to the information busses 232, 236, and 240. The outputs of the PR–2 shift registers 154 are connected to gates 244 which are enabled by signals on the line MAR–1, and the outputs thereof are directed via buffers to the information busses 232, 236, and 240.

The outputs of the fourth stage of the V–1 shift registers 156 are connected to gates 236 which are enabled by signals on line MAR–2, and the outputs of the gates 244 are directed via buffers to the information busses 238, 234, and 242. The outputs of the V–2 shift registers are connected via gates 248, enabled by signals on the line MAR–1 through buffers to the information busses 238, 234, and 242.

The information busses 232, 236, and 240 are all connected respectively to the three recording heads 224 for the bins 106, 108, 110, and 112, storing prices representing Last, Closed, High, and Low prices; these lines are also connected to the three recording heads for the Bid price bin 114. The information busses 234, 238, and 242 are connected to the recording heads, respectively, for the Volume bin 116 and the Ask bin 118. In addition, the information busses 232–240 are respectively connected to the five recording heads for the SIC bin 120.

The write-signal lines 194–206 are connected via certain buffers, where appropriate, and certain ones of write-signal gates 250–262, the latter of which are connected respectively to the write-signal lines 210 for the recording heads of the bins 106–118. The signal line 194 is connected to the gates 250, 254, and 260 for the Last, High, and Volume bins. The write-signal line 196 is connected to the gate 250, 256, and 260 for the Last, Low, and Volume bins. The write-signal line 198 is connected to the gate 250 and 260 for the Last and Volume bins; the write-signal line 200 is connected to the gate 254 for the High bin; the signal line 202 is connected to the gate 254 and 256 for the High and Low bins; the line 204 is connected to the gate 256 for the Low bin; and the line 206 is connected to the gates 258 and 262 for the Bid and Ask bins.

The other inputs to the gates 250–262 and to gate 190 are the gating signals U–1 which are timing signals recurring at the time P–1 derived from the address coincidence 216 when coincidence exists. Additional outputs from the address coincidence 216 are U–2 signals occurring at timing pulses P–2 which are used as shift pulses for the PR and V registers via gates 266 and 268 (respectively enabled by signals on lines MAR–1 and MAR–2). The U–2 outputs of the gate 266 are supplied to the V–2 registers 158 and the PR–2 registers 154 as shift pulses, and the U–2 outputs of gate 268 are supplied to the V–1 registers and the PR–1 registers as shift pulses.

The operation of the MAR–1 and –2 registers for updating purposes is controlled by the logic shown in FIG. 9. The start-of-message signal on line SM (derived from flip-flop 49 in FIG. 2) sets a first flip-flop 270, the 1-output of which is gated by the next P–3 pulse to set a second flip-flop 272, the 1-output of which is used as a B signal. The flip-flops 270 and 272 are reset (e.g. manually) at the beginning of an operating day. The B signal from flip-flop 272 is gated by the SM signal to set FF–274, the 1-output of which is gated by RP–3 (the P–3 pulse following the quadrant pulse R) to set FF–276. The output of FF–276 is gated by timing pulses P–2 in gate 278 to provide circulating shift (CS) pulses that are supplied to two gates 280 and 282. The first CS pulse is also used to reset FF–274.

The 1-output of FF–276 is also gated by RP–2 to trigger counter 284, which counter is a 2-stage binary counter that counts to 4, which count of 4 is strobed in gate 286 by P–3 to reset FF–276. When FF–276 continues in reset condition, the counter 284 is maintained reset via P–1 timing pulses through gate 288 enabled by the 0-output of FF–276.

The 0-output of FF–276 is also connected via a gate 290 to the R-input of FF–292. Gate 290 is pulsed by timing pulse P–3 occurring at G–4. The latter timing pulse is also used to gate the 1-output of FF–276 through gate 294 to set FF–292. The 1-output of FF–292 is used as a control signal at the output of the address coincidence to enable two gates 294 and 296, which gates respectively pass P–1 and P–2 signals from the address coincidence, when coincidence has been detected therein, so that the outputs of these gates are U–1 and U–2 occurring respectively at the timing pulses P–1 and P–2.

Details of the logic of the address coincidence 216 are shown in FIG. 10. A first comparison gate 300 compares the *a*-bit from the drum bin 120 with the negative of the *a'*-bit from the shift registers SIC–1. A second such gate 302 compares the *a'*-bit from the registers with the negative *a*-bit from the drum. Gates 300 and 302, one or the other of them, produces an output pulse only when there is absence of coincidence. In a similar fashion, eight other comparison gates 304 compare the *b, c, d,* and *e*-bits from the registers SIC–1 with the bits coming from the SIC tracks in bin 120. The outputs of the gates 300, 302, and 304 are buffered together and applied to a gate 306. Gate 306 is enabled by at least one of the outputs from the gates 300, 302, and 304 in the absence of coincidence. Timing pulse P–2 through enabled gate 306 sets flip-flop 308, which flip-flop is reset at the start of each address cell in SIC bin 120 by the I–1 index pulse. Thus, in the absence of coincidence, FF–308 would be in set condition by the end of an SIC cell; and upon coincidence of the addresses, FF–308 would still be in reset condition at the end of the SIC cell.

The condition of FF–308 is strobed by the timing pulse P–3 occurring at G–4 via gate 310. The output of gate 310 sets FF–312. FF–312 remains set for a full cell rotation of the drum 36, being reset at timing pulse P–2 of the next G–4. While FF–312 is set, successive timing pulses P–1 are passed by enabled gate 314 and applied to gate 294 to provide the updating pulses U–1. The output of gate 314 is also used to set FF–316, the outputs of which are strobed by timing pulse P–2 and applied to gate 296 to develop the updating pulses U-2. FF–316 is reset at the end of an SIC cell by G–4 and P–3.

In operation, the first message develops an SM signal to set flip-flop 270 (previously reset) and flip-flop 272. Thereby, a B signal is developed to enable gates 320 and 322 to pass the MAR–1 and MAR–2 signals.

The first message being operated upon by the word assembler 44 is assembled in the MAR–1 (SIC, PR, and V) registers since the MAR–1 line is carrying an enabling signal for the loading gates 138–144 in the SIC–1 registers. The MAR–2 line carries a disabling signal at that time to close the circulating gates 222 in the SIC–1 registers. Also at that time, the disabling signal on line MAR–2 closes gates 218 at the outputs of the SIC–1 registers, closes gates 230 at the outputs of the PR–1 registers, and also closes gates 246 at the output of the V–1 registers.

At the end of the first message, its assembly in MAR–1 is completed; the receipt of the second message in the word assembler 44 is recognized by the synchronizer pulses that enable the gate 46 to set the flip-flop 49, and the next start-of-message signal SM is applied to FF–94. Consequently, line MAR–2 starts to carry an enabling signal and line MAR–1, a disabling signal for assembly of the second message. The assembly of this message in MAR–2 (SIC–2, V–2, and PR–2) is performed in the manner described above. This second message generates a pulse on line SM which is used in the control logic of FIG. 9 to start the updating operation. The flip-flop 272 is set from the previous start-of-message signal so that the second such signal is effective to set FF–274. The next quadrant signal occurring at timing pulse P–3 is effective to gate the 1–output of FF–274 to set FF–276. The set condition of FF–276 results in a string of circulating shift pulses derived from P–2 via gate 278 and applied to gates 280 and 282.

Since MAR–2 is enabled at this time, gate 280 is enabled to supply a string of shift pulses to SIC–1 registers 128–134. Also enabled at this time, are the circulating gates 222 (while the loading gates 138–144 are closed by the disabling signal on line MAR–1). Output gates 218 are also enabled at this time, and as successive shift pulses are applied to the SIC–1 registers, their outputs are passed by the gates 218 and supplied to the inputs of address coincidence 216. The address coincidence in FIG. 10 compares the five bits, *a′–e′*, from the SIC registers with the corresponding five bits, *a–e*, from the SIC bin 120. This operation is performed for an entire cell of four groups of five bits making the total address of twenty bits. This operation is repeated for successive cells until an SIC cell in bin 120 is coincident with the address stored in SIC–1 registers. Consequently, the FF–308 (FIG. 10) remains reset over that entire cell resulting in FF–312 becoming set. Consequently, the next four timing pulses P–1 are passed by gate 314 and applied to gate 294; the timing pulses P–2 are also passed to gate 296, which gates 294 and 296 are enabled by the updating signal U. The updating signal U is derived from FF–292 only at the end of the cell by timing pulses G–4 and P–3, setting FF–292. Consequently, the U–1 and U–2 signals from the gates 294 and 296 are derived starting with the first bit of a cell.

The U–2 pulses are supplied to enabled gate 268 (FIG. 8*a*) and are passed thereby to be supplied to the PR–1 and V–1 shift registers as shift pulses. Since the gates 230 and 246 are enabled at that time, the signals stored in PR–1 and V–1 are passed by those gates and supplied to the information busses 232–242. Four such shift pulses U–2 are generated from the address coincidence 216 so that the PR–1 and V–1 registers are completely emptied.

Depending upon the combination of MI digits established in the M–1 register 66, a certain one or a plurality of the write-signal gates 190 and 250–262 are enabled. Thus, for the MI combination of 0011, the gate 174 enables gate 190 to permit a series of four U–1 pulses to be applied to the write amplifiers in recording heads 192 via the lines 210. Consequently, the message signals on the information busses 232–240 (ultimately derived from the PR–1 registers and the last two V–1 registers) are supplied to the recording head amplifiers 192 and written in the five tracks of SIC bin 120 (erasing the previously stored signals at the same time). At the conclusion of the four U–1 pulses, a new address exists at the SIC cell immediately following the one identified by the message stored in SIC–1.

The "write" pulses U–1, in effect, gate in the recording heads 192 the information signals established as levels on the information busses 232–240 from the output stages of the PR–1 and V–1 registers. The transients produced by the shift pulses U–2 are, of course, not gated in the recording heads 192.

If the MI code in register 166 is 0100, line 194 receives an enabling signal, and gates 250, 254, and 260 are enabled to pass the four U–1 pulses so that the write signals U–1 are passed to the recording heads for the Last bin 106, the High bin 120, and the Volume bin 116.

The U–1 write signals passed by gate 250 are transmitted through the normally closed contacts 320 of a relay 322 to record the new Last price in place of what was previously recorded. The relay 322 is energized by a switch 324 which may be manually operated. The gate 252 is also enabled by the signal on line 194; but the normally open contacts 322 prevent the passage of the U–1 signals to the recording head for the Close bin 108. Upon operation of the switch 324 (say, by an operator at the beginning of the day) the relay coil 322 is energized and the contacts 320 become open, and contacts 322, closed. As a consequence, the bin 108 would become the Last bin for purposes of an updating operation, and the bin 106 would become a Close bin since it would contain the prices stored therein at the close of the business of the day before. The read-out of signals from the bins 106 and 108 is described in the aforementioned copending patent application. Preferably at the start of each day, all of the information bins (except the new Close bin) should be erased completely.

The updating of the drum information bins 106–118 for the different combinations of message identifiers and registers 166 will be apparent from the foregoing description. When an address is to be changed on the drum 36, the information carried in the PR and V portions of the message (bit positions 41–70) are the new SIC identifying bits (only twenty of the twenty-four possible message bits are necessarily employed). For some of the messages, both the PR and V sections of the message carry information, which is respectively price and volume information. In certain types of messages, only price is carried in the PR portion of the message, and no useful information is carried in the V portion of the message. For message identifier 1000 which corresponds to Bid and Ask information being carried by the message, both the PR and V portions of the message are used to carry the corresponding price information.

After the information bins in the drum have been updated, and the drum revolution completed, the counter 284 (FIG. 9) registers a count of 4 which is strobed in gate 286 to reset FF–276. This condition of FF–276 terminates the generation of the circulating pulses that are applied to the gates 280 and 282 so that no further operation takes place during a second revolution of the drum.

Upon the completion of the assembly of the second message in MAR–2 (SIC–2, PR–2, and V–2), and upon the start of a third message, the third SM signal is generated by a flip-flop 49 to trigger FF–94 and to set FF–274 (FIG. 9). This condition then starts the loading of the third message in the MAR–1 registers and conditions the MAR–2 registers for the updating operation that has just been described. That is, MAR–1 now carries the enabling signal which controls the loading of the MAR–1 registers, and also controls the updating of the MAR–2 registers, their contents into the drum storage bins. MAR–2 carries a disabling signal which prevents any updating operation from the MAR–1 registers. During loading of the PR–1 and V–1 registers at this time, any information left over therein from the previous updating operation is dropped as the new information is loaded therein. Likewise, the previous SIC stored in the SIC–1 registers is dropped as the new SIC is loaded in the registers. The previous operations are repeated alternately via MAR–1 and MAR–2.

The first message does not set flip-flop 274 (FIG. 9) because of the delay in generating B. Consequently, the flip-flop 276 is not set and the CS pulses and updating signal U are not generated. As a result, the SIC–2 registers are not circulated, and the address coincidence and updating operations are not performed so that any information left in the MAR–2 registers from the previous day is not written on the drum.

The separation of the word assembler 44 from the message assembler registers that handle the information to be stored affords an effective specialization of function with the economy of a single set of connections to the parity checker 21 and to the synchronizer logic and the elimination of the parity bits before assembly in the MAR–1 and –2 registers.

Figure 6:
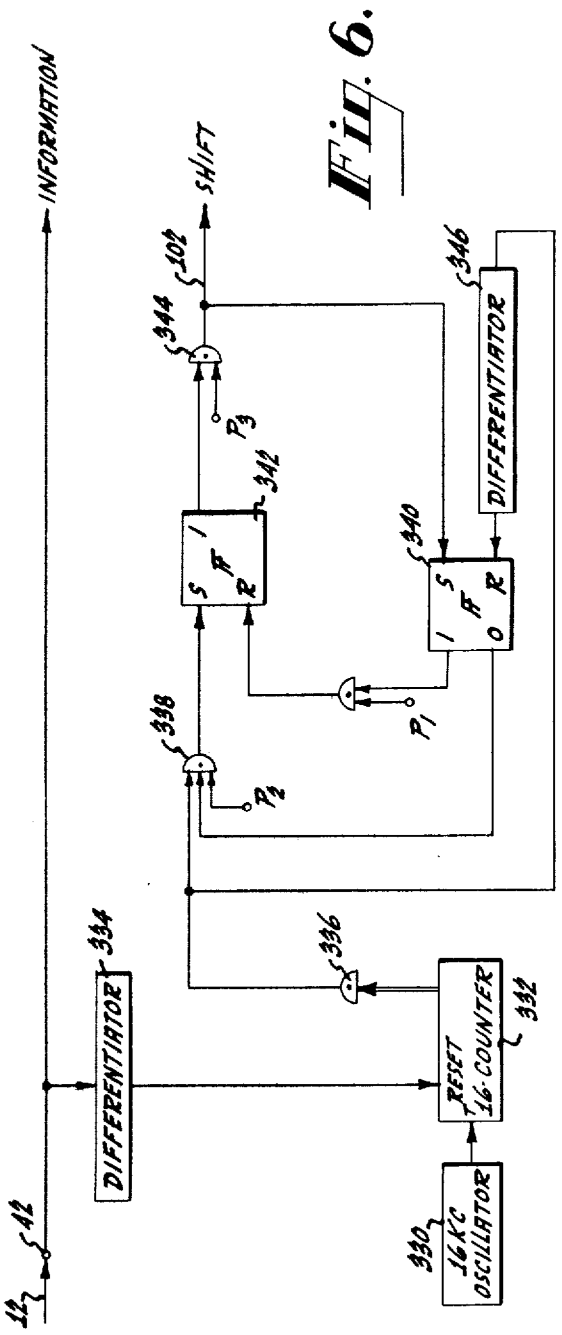
FIG. 6 is a schematic block diagram of a shift pulse generator that may be used in the system of FIG. 2.

The shift pulse generator 20 is used to establish synchronization between the timing 32 for the logic controls and the timing of the messages transmitted on the transmission line 12, which are supplied in an asynchronous fashion. The generator logic shown in FIG. 6 includes an oscillator 330 operating at a 16 kilocycle rate which feeds pulses to be counted in a counter 332. The message signals in the form of mark and space pulses transmitted on the line 12 are differentiated in a differentiator 334 and used to reset the counter 332 to zero. The counter 332 is a 4-stage binary counter that automatically recycles upon a count of 16. The count of 8 in the counter 332 is detected by a gate 336 whose inputs are the appropriate outputs of the different counter stages for registering the desired count. The output of gate 336 is sampled in another gate 338 by means of the 0-output of a flip-flop 340 and by a timing pulse P2. The output of gate 338 sets a second flip-flop 342, the 1-output of which is gated by P–3 in gate 344 to provide shift pulses on the line 102. The output of gate 344 is also used to set flip-flop 340, the 1-output of which is gated by a P–1 timing pulse to reset flip-flop 342. The output of gate 336 resets flip-flop 340 via a differentiator 346.

In operation, the signal transition going from mark to space pulses in the message signals supplied by the line 12 are used to reset the counter 332 as a consequence of the differentiating action in differentiator 334. The first P–2 pulse occurring after counter 332 establishes a count of 8, gates through gate 338 to set flip-flop 342. If this pulse P–2 just barely overlaps the count of 8, the output of the gate 338 may not be sufficient to set flip-flop 342; however, the count of 8 remains registered for several successive P–2 pulses. Once flip-flop 342 is set, the succeeding timing pulse P–3 establishes through gate 344 a well-formed shift pulse on line 102. The output of gate 344 sets flip-flop 340 to reset flip-flop 342 on that the succeeding P–3 pulse finds the latter flip-flop reset. Accordingly, only one shift pulse is established on line 102 for each full cycle of the counter 332. After the first shift pulse is generated, the logic is reestablished in condition for generating the next synchronized shift pulse at the next count of 8.

The repetition rate of the P–2 pulses, which is the bit rate on the storage drum 36, may be the order of 90–100 kc., or even several times that. It is apparent, therefore, that some five to six P–2 pulses are generated during that time that the counter 332 is registering a count of 8. The resetting of the counter 332 takes place at the leading edge of a transition from mark to space pulse in the message signals. Since it is quite possible to have ten or twenty mark signals, or that many space signals, in a row, that many or more full cycles of the counter 332 may occur without its being synchronized to the message signals. However, with this system, cumulative errors are avoided so that the ultimate shift pulse which is generated is always in the correct bit position of the message.

The 16 kc. oscillator 330 is a crystal oscillator that has a repetition rate tolerance of the order of one part in in a million. The counter 332 follows the oscillator 330 and does not add any tolerance errors into the timing. At some initial point, a mark-space transition in the message resets the counter 332. The next count of 8 occurs some time just following the midpoint of the message bit. If we divide the latter into sixteen equal parts, the count of 8 occurs at the latter end of the eighth or the beginning of the ninth part. The shift pulse likewise is generated substantially at the same time and is, therefore, essentially centered with respect to the information bit. Even with twenty or more successive space or successive mark pulses, that is, a period of many milliseconds passing without another resetting of the counter 332 to assure resynchronization, the cumulative error is still not significant. The cumulative error due to the tolerances is only of the order of one part in ten-thousand or even one part in a thousand, and therefore, negligible under these circumstances. Thus, an extraordinarily large number of marks and spaces can occur (far more than would ever be expected in practice) without running into a cumulative error of the order of fifty percent, 8 sixteenths, which is the error that would be required to cause an error in the location of the shift pulse with respect to an information bit in the mesages. Thus, the asynchronous, but precise, oscillator is effective with the logic of FIG. 6 to synchronize the message assembly to the timing of the remainder controls which is tied to the storage drum 36.

It is seen from the foregoing description that a new and improved information storage system is provided. The storage files of stock transaction information are maintained current while these files are available to a plurality of users, substantially simultaneously, for selection of any part of the stored information. An improved digital transmission and checking system and a magnetic drum write-in system are employed in this invention.

What is claimed is:

1. In a stock information system, apparatus for storing and updating a plurality of categories of stock information which comprises (a) means for receiving a message having a coded multi-character stock identification section, a separate coded information section concerning the identified stock, and a separate coded category identification section identifying the category of information in said information section, (b) a cyclic memory having a cyclic stock identification section for coded multi-character identifications of stocks and a plurality of separate cyclic sections for a plurality of different categories of stock information, said different categories for a respective stock occurring simultaneously in the respective cyclic sections, (c) storage means having stock identification and stock information sections, (d) means for supplying to respective sections of said storage means the multi-character stock identification and stock information in respective sections of said message, (c) coincidence means for determining coincidence of the multi-character stock identifications in said storage means and in said cyclic memory, (f) transfer means responsive to said coincidence for transferring stock information in said storage means to said cyclic memory, (g) and control means responsive to the category identification in said message for directing the transferred stock information to the corresponding category section of said cyclic memory.

2. Apparatus in accordance with claim 1 in which said message has a plurality of separate coded information sections and said category identification section has a coded identification of the plurality of categories of information in said information sections, said storage means including a plurality of stock information sections, said transfer means including means responsive to said coincidence for simultaneously transferring information in said plurality of stock information sections to a corresponding plurality of information sections of said cyclic memory, and said control means including means responsive to the category identification in said message for directing the transferred stock information to corresponding category information sections of said cyclic memory.

3. Apparatus in accordance with claim 2 in which said cyclic memory is a magnetic drum and said stock identification and stock information sections comprise separate tracks on the drum.

4. Apparatus in accordance with claim 3 in which said storage means comprises storage register sections for receiving respective coded stock identification and stock information signals in said message.

5. Apparatus in accordance with claim 4 in which said message is binary coded and of fixed format, said message having an initial section of predetermined bit configuration and said stock identification, stock information and category identification sections having predetermined bit locations in the message, and including means for recognizing said initial section and means responsive to said recognition for positioning the bits of said message sections in respective storage register sections.

6. Apparatus in accordance with claim 1 including a pair of said storage means, and means for supplying the stock identification and stock information in successive messages alternately to said storage means.

7. Apparatus in accordance with claim 1 in which said coded information section of the message contains a coded multi-character stock identification different from that in the stock identification section thereof and the category identification section contains a coding indicating the category is a stock identification, said control means including means responsive to said category coding for directing the transfer of information from said storage means to the stock identification section of the cyclic memory.

References Cited by the Examiner

UNITED STATES PATENTS

| | | | |
|---|---|---|---|
| 2,860,323 | 11/1958 | Burkhart et al. | 340—174 |
| 2,895,123 | 7/1959 | Foster et al. | 340—174 |
| 3,012,227 | 12/1961 | Astrahan et al. | 340—172.5 |
| 3,017,610 | 1/1962 | Auerbach et al. | 340—172.5 |
| 3,037,697 | 6/1962 | Kahn | 235—163 |
| 3,040,984 | 6/1962 | Cox et al. | 235—153 |
| 3,045,217 | 7/1962 | Housman et al. | 340—174.1 |
| 3,048,831 | 8/1962 | Sharp | 340—174.1 |
| 3,082,402 | 3/1963 | Scantlin | 340—172.5 |

ROBERT C. BAILEY, *Primary Examiner.*

DARYL W. COOK, *Examiner.*

P. HENON, W. M. BECKER, *Assistant Examiners.*